United States Patent
Donovan

(10) Patent No.: US 8,130,135 B2
(45) Date of Patent: Mar. 6, 2012

(54) BI-STATIC RADAR PROCESSING FOR ADS-B SENSORS

(75) Inventor: Timothy P. Donovan, Groton, MA (US)

(73) Assignee: Raytheon Company, Waltham, MA (US)

( * ) Notice: Subject to any disclaimer, the term of this patent is extended or adjusted under 35 U.S.C. 154(b) by 318 days.

(21) Appl. No.: 12/578,861

(22) Filed: Oct. 14, 2009

(65) Prior Publication Data

US 2010/0090882 A1 Apr. 15, 2010

Related U.S. Application Data

(60) Provisional application No. 61/196,164, filed on Oct. 14, 2008.

(51) Int. Cl.
*G01S 13/93* (2006.01)
(52) U.S. Cl. .............. 342/30; 342/32; 342/36; 342/37; 342/46
(58) Field of Classification Search .............. 342/29–38, 342/46, 417
See application file for complete search history.

(56) References Cited

U.S. PATENT DOCUMENTS

| | | | | |
|---|---|---|---|---|
| 6,792,058 | B1 * | 9/2004 | Hershey et al. | 375/347 |
| 6,952,631 | B2 | 10/2005 | Griffith et al. | |
| 7,006,032 | B2 * | 2/2006 | King et al. | 342/29 |
| 7,095,360 | B2 | 8/2006 | Kuji et al. | |
| 7,414,567 | B2 * | 8/2008 | Zhang et al. | 342/29 |
| 7,612,716 | B2 * | 11/2009 | Smith et al. | 342/454 |
| 7,782,256 | B2 * | 8/2010 | Smith | 342/453 |
| 7,965,227 | B2 * | 6/2011 | Kozhevnikov et al. | 342/145 |
| 8,004,452 | B2 * | 8/2011 | Rolfe et al. | 342/37 |
| 2007/0252760 | A1 * | 11/2007 | Smith et al. | 342/451 |
| 2008/0088508 | A1 * | 4/2008 | Smith | 342/453 |
| 2009/0201191 | A1 * | 8/2009 | Kozhevnikov et al. | 342/32 |
| 2010/0090882 | A1 * | 4/2010 | Donovan | 342/32 |
| 2010/0090891 | A1 * | 4/2010 | Donovan | 342/357.07 |
| 2011/0057828 | A1 * | 3/2011 | Brunet | 342/28 |

FOREIGN PATENT DOCUMENTS

| | | |
|---|---|---|
| EP | 1 045 256 A1 | 10/2000 |
| WO | WO 2008/067306 A2 | 6/2008 |
| WO | WO 2008/067306 A3 | 6/2008 |

OTHER PUBLICATIONS

PCT Search Report of the ISA for PCT/US2009/060606 dated Feb. 5, 2010.
Written Opinion of the ISA for PCT/US2009/060606 dated Feb. 5, 2010.
International Preliminary Report on Patentability for PCT/US2009/060606 dated Apr. 28, 2011.
Radar Basics, Secondary Radar Technology, 2007. www.radartutorial.eu/13.ssr/sr01.en.html pp. 1-21, May 30, 2007.
PCT/US2008/065221, PCT Article 17(3)(a) and Rule 40.1 and 40.2(e) Invitation to Pay Additional Fees, dated Feb. 24, 2009 and Partial Search Report., 5 pages.

(Continued)

*Primary Examiner* — John Sotomayor
(74) *Attorney, Agent, or Firm* — Daly, Crowley, Mofford & Durkee, LLP

(57) ABSTRACT

A system and technique to derive a position of a non-ADSB equipped aircraft using ADS-B information provided from an ADSB equipped aircraft and bi-static radar processing techniques.

15 Claims, 5 Drawing Sheets

OTHER PUBLICATIONS

Notification of transmittal of the International Search Report dated May 12, 2009, PCT/US0028/065221.

The International Search Report dated May 12, 2009, PCT/US0028/065221.

Written Opinion of the International Searching Authority dated May 12, 2009, PCT/US0028/065221.

B. Evans, A Single Solution to ADS-B, Avionics Magazine, vol. 29, No. 5, May 1, 2007, pp. 38-41.

Raytheon, ADS-B Information Display, 2007 CNS/ATM Conference, Apr. 23-26, 2007, pp. 1-19.

Hanna, S., et al., Flight Conflict Management System (FCMS), The Design of a Low Altitude General Aviation Free Flight Zone, Air, Systems and Information Engineering Design Symposium, Apr. 24-25, 2003, IEEE, pp. 51-56.

Frain et al., CNS/ATM for Tactical Military Aircraft, The $22^{nd}$ Digital Avionics Systems Conference Proceedings, Indianapolis, IN, Oct. 12-16, 2003, New York, NY, IEEE, vol. 1, Oct. 12, 2003, pp. 4D11-4D19.

H.D. Griffiths, Bistatic and Multistatic Radar, Univ. College London, Dept. Electronic and Electrical Engineering, Apr. 28, 2009, 10 pages.

N. Willis, Bistatic Radar, ISBN 0-89006-427-X, Jan. 1, 2005, 2 pages.

File downloaded from U.S. Appl. No. 12/129,855, filed May 30, 2008, file through Oct. 14, 2009, 212 pages.

\* cited by examiner

BI-STATIC RADAR PROCESSING FOR ADS-B SENSORS

CROSS REFERENCE TO RELATED APPLICATION

This application claims the benefit of U.S. Provisional Application No. 61/196,164 filed Oct. 14, 2008 under 35 U.S.C. §119(e) which application is hereby incorporated herein by reference in its entirety.

FIELD OF THE INVENTION

The subject matter described herein is generally related to air traffic control (ATC) systems and more particularly related to an ATC surveillance system and technique to derive location of a Mode A/C/S aircraft using bi-static radar processing techniques.

BACKGROUND OF THE INVENTION

As is known in the art, aircraft are equipped with transponders to help air traffic control (ATC) radar systems identify and track civilian aircraft. So-called Mode A or C transponders (Mode A/C transponders) receive Mode A or C interrogation signals transmitted at a frequency of 1030 MHz from secondary surveillance radars (SSRs), such as ASR-9 radars. The Mode A/C transponders respond to the interrogation signals at a frequency of 1090 MHz with the aircraft identity (beacon code) and altitude respectively. The SSR couples this information with the antenna azimuth, and derived range and provides a position report to a local ATC system.

Another type of transponder is a so-called Mode S transponder. Mode S transponders operate on a similar principle to Mode A/C transponders but include enhancements to minimize interference caused by responses to interrogations from adjacent secondary radars. A protocol is established to select and address interrogations to specific aircraft.

As is also known, Automatic Dependent Surveillance Broadcast (ADS-B) is a capability added to Mode S transponders. As described by the FAA (Federal Aeronautics Administration) ADS-B is a technology which uses signals from Global Positioning Satellites (GPS), instead of radar data, to determine aircraft position.

ADS-B systems broadcast aircraft position, altitude, velocity and identity on a period of 400-600 msec for position, and 5000 msec for identify (e.g. call sign or flight name). All messages include a unique Mode S address, and the identity includes the aircraft call sign used on the flight plan (e.g. FDX1964).

These messages are broadcast as Mode S "responses" at a frequency of 1090 MHz and are received by ADS-B ground receivers where the position, altitude, velocity and identity is extracted and provided to an ATC automation system. These signals are also received by airborne ADS-B receivers where the data is provided to the cockpit display.

SUMMARY OF THE INVENTION

Described herein is a system and technique to derive a position of a non-ADSB equipped aircraft using ADS-B information provided from an ADSB equipped aircraft and bi-static radar processing techniques.

In accordance with the concepts described herein, a process for determining a position of a non-Automatic Dependent Surveillance Broadcast (non-ADSB) equipped aircraft includes receiving, in a bi-static receiving system, a first group of signals from a first ADSB equipped aircraft; receiving, in the bi-static receiving system, a second group of signals from a first non-ADSB equipped aircraft; and processing the first and second group of signals in the bi-static receiving system using a bi-static radar processing technique to determine a position of the non-ADSB equipped aircraft.

With this particular arrangement, a process to derive a position of a non-ADSB equipped aircraft using ADS-B information provided from an ADSB equipped aircraft and bi-static radar processing techniques is provided. In one embodiment, the first group of signals correspond to ADS-B signals provided by an ADS-B equipped aircraft and the second group of signals correspond to one of Mode A/C/S responses from a non-ADSB equipped aircraft (i.e. an aircraft not having an ADS-B receiver disposed therein). The ADSB-signals are used to determine a position (e.g. an azimuth position) of an antenna used in an interrogator. Once the interrogator antenna position is known, the position of non-ADSB equipped aircraft can be derived by using the azimuth position of the interrogator antenna, a range to the non-ADSB equipped aircraft and a known distance between the interrogator and the bi-static receiving system.

In accordance with a further aspect of the concepts described herein a system to derive a position of a non-ADSB equipped aircraft, includes (a) an interrogator and (b) a bi-static receiving system. The interrogator includes an interrogator antenna and an interrogator receiver. The bi-static receiving system includes an antenna configured to receive Mode A/C/S signals and Mode ADS-B signals, an interrogator processor configured to process Mode A/C/S signals, an ADS-B processor configured to process ADS-B signals, an azimuth determination processor coupled to receive signals from said ADS-B processor and to determine an azimuth position of the interrogator antenna, and a position determination processor coupled to receive signals from said azimuth determination processor and said interrogator processor and to derive a position of the non-ADSB equipped aircraft.

In some embodiments the bi-static receiving system is stationary while in other embodiments the bi-static receiving system may be mounted on a moving platform (e.g. an aircraft or a ground vehicle). Similarly, in some embodiments the interrogator is stationary while in other embodiments, the interrogator is mounted on a moving platform. Regardless of whether either or both of the bi-static receiving system and the interrogator are in a fixed position or mounted on mobile platforms, the distance between the bi-static receiving system and the interrogator must be known.

In one embodiment, the interrogator corresponds to a secondary surveillance radar (SSR) of an air traffic control system. In one embodiment, the interrogator antenna is one of a rotating antenna or an electronically scanned antenna.

In one embodiment, the bi-static receiving system includes an ADS-B receiver and a processor configured to perform bi-static radar processing.

In accordance with a still further aspect of the concepts described herein, a method to derive a position of a non-ADSB equipped aircraft includes determining, in a bi-static receiving system, a position of an interrogator antenna as a function of time using one or more ADSB signals from an ADSB equipped aircraft; and deriving a position of the non-ADSB equipped aircraft using the position of the interrogator antenna and one or more transponder signals from the non-ADSB equipped aircraft.

In one embodiment, determining a position of an interrogator antenna as a function of time comprises determining an azimuth of the interrogator antenna. In one embodiment, deriving a position of the non-ADSB equipped aircraft comprises deriving a position of the non-ADSB equipped aircraft using an azimuth position of the interrogator radar In one embodiment, deriving a position of the non-ADSB equipped aircraft using the position of the interrogator antenna includes transmitting one or more Mode A/C/S transponder signals from an interrogator having an interrogator antenna; receiving, in the bi-static receiving system, one or more Mode A/C/S transponder reply signals provided by the non-ADSB equipped aircraft; computing a longitude and latitude of the non-ADSB equipped aircraft using the azimuth position of the interrogator antenna, a range to the non-ADSB equipped aircraft and a known distance between the interrogator and the bi-static receiving system.

Since Automatic Dependent Surveillance Broadcast (ADS-B) uses the Mode S protocol, most ADS-B receivers are capable of receiving all Mode S responses including responses to interrogations from SSRs. Normally, these Mode S responses are discarded by ADS-B systems as they do not contain the position of the aircraft. In accordance with the systems and techniques described herein below, however, it has been recognized that a position of non-ADS-B equipped aircraft may be determined using ADS-B information from ADS-B equipped aircraft and bi-static radar processing techniques.

In one embodiment this may be accomplished by coupling an antenna having a substantially omni-directional antenna pattern to a single ADS-B receiver. With this approach, an Air Traffic Control (ATC) surveillance technology is provided with which it is possible to derive the position and altitude of Mode A/C/S aircraft (i.e. non-ADSB equipped aircraft) using the single ADS-B receiver and omni-directional antenna using bi-static radar processing techniques.

In one exemplary embodiment, this technique may be implemented in software that processes ADS-B inputs either as part of a ground-based system (e.g. ATC or airline operations) or as part of airborne avionics (e.g. cockpit display of traffic information (CDTI) or traffic collision avoidance system (TCAS)). Such software may be provided in partnership with an ADS-B radio provider or as a stand-alone processing component to augment existing ground automation.

In operation, an aircraft with a Mode A/C/S transponder using an ADS-B receiver with bistatic processing of transponders replies to local interrogators (e.g. SSRs). Radar azimuth based mode-S responses from ADS-B aircraft are determined. It should be appreciated that only a single sensor is required for terminal coverage. This technique can be used in a number of applications including, but not limited to command, control and communication systems, netted sensors, transportation.

BRIEF DESCRIPTION OF THE DRAWINGS

The foregoing features of this invention, as well as the invention itself, may be more fully understood from the following description of the drawings in which.

DETAILED DESCRIPTION OF THE PREFERRED EMBODIMENTS

Figure 1:
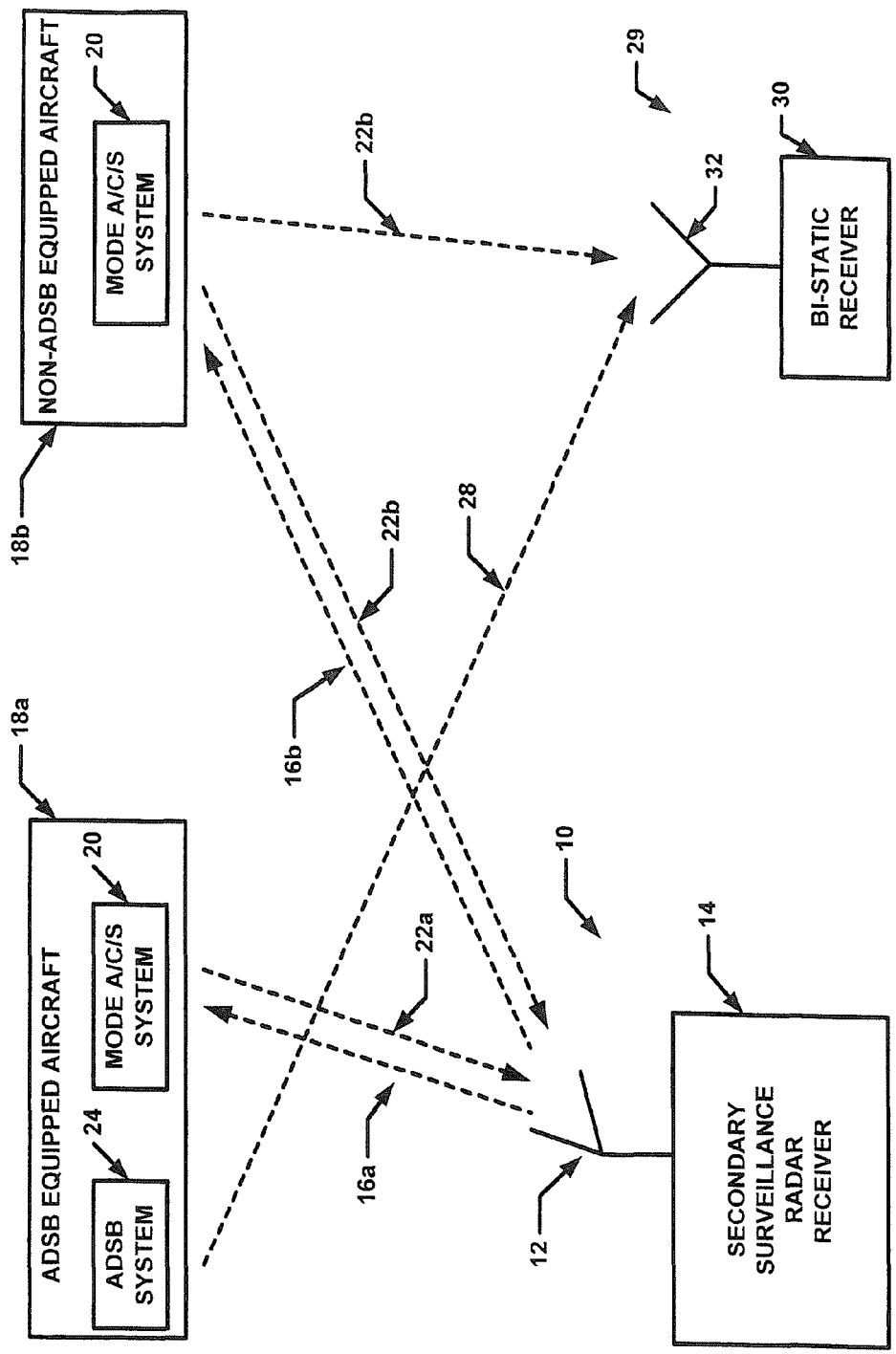
FIG. 1 is a block diagram of an a system to determine a position of an aircraft not equipped with an automatic dependent surveillance broadcast (ADS-B) transponder.

Referring now to FIG. 1, an air traffic control (ATC) surveillance system includes a secondary interrogator 10 which may, for example, be provided as a conventional secondary surveillance radar ("SSR") 10 (also more simply referred to as a "secondary radar") which includes an antenna 12 and a receiver 14. To promote clarity in the below description, interrogator 10 will sometimes be referred to herein as an SSR 10. Also, in some embodiments antenna 12 is provided as a rotating antenna.

Interrogator 10 may be in a fixed position (e.g. a ground station co-located with a primary ATC radar) or interrogator 10 may be disposed in a moving vehicle (e.g. an aircraft or a ground-based vehicle). Interrogator 10 may, for example, correspond to a Traffic alert and Collision Avoidance System (TCAS). It should be appreciated that when deployed as part of TCAS, antenna 10 does not rotate.

As antenna 12 scans (e.g. by mechanical rotation or by electrical scan), interrogator 10 transmits interrogation signals (or pulses) 16a, 16b. In some embodiments, (e.g. conventional SSR embodiments) interrogator 10 continuously transmits interrogation signals while in other embodiments interrogator 10 transmits interrogation signals selectively rather than continuously (e.g. in transponder Mode-3, Mode-4 and Mode-5. In either case, the so-transmitted interrogation signals 16a, 16b impinge upon aircraft 18a, 18b which are within line-of-sight range of interrogator 10.

Both aircraft 18a and 18b are equipped with a transponder system 20. Each transponder system 20 includes a radio receiver and a transmitter. In existing air traffic control systems, the receiver receives on a first frequency (e.g. 1030 MHz) and the transmitter transmits on a second different frequency (e.g. 1090 MHz) although for purposes of the concepts, systems and techniques described herein, this need not be so.

In response to interrogation signal 16a, transponder 20 on target aircraft 18a transmits reply signal 22a to interrogator 10. Similarly, in response to interrogation signal 16b, transponder 20 on target aircraft 18b transmits reply signal 22b to interrogator 10. Reply signals 22a, 22b contain information related to the respective aircraft 18a, 18b from which signals 22a, 22b were emitted (in response to the request from interrogator 10). In some embodiments, reply signals 22a, 22b may be provided as coded reply signals.

The information included in a particular reply sent by any transponder 20 depends upon the transponder mode which was interrogated. There are several transponder modes, each offering different information. For civilian flights, three transponder modes of operation are: Mode A, Mode C and Mode S (sometimes collectively denoted herein as Mode A/C/S). Transponder Modes A/C/S are well-known to those of ordinary skill in the art and will not be described herein in detail.

Significantly, the information exchanged between interrogator 10 and transponder 20 is limited to identification of the aircraft on which the transponder is disposed in addition to the aircraft flight level (i.e. a standard nominal altitude of an aircraft pressure altitude). Interrogator 10 also allows the aircraft to be displayed as an icon on an air traffic controller's radar screen at a calculated bearing and range.

Interrogators, derive the latitudinal and longitudinal position of an aircraft based upon signal timing and antenna direction.

As shown in FIG. 1, aircraft 18a is also equipped with an ADS-B transponder 24 (which is configured to communicate with transponder 20 on aircraft 18a) while aircraft 18b is not equipped with an ADS-B system. Thus, aircraft 18a is sometimes referred to herein as an ADSB equipped aircraft while aircraft 18a is sometimes referred to herein as a non-ADSB equipped aircraft.

An ADS-B-equipped aircraft (such as aircraft 18a) determines its own position using a global navigation satellite system or internal navigation system and periodically broadcasts this position and other relevant information to ground stations and other aircraft equipped with ADS-B systems and thus capable of receiving ADS-B signals. As is known, ADS-B can be used over several different data link technologies. Since aircraft 18a is equipped with an ADS-B system 24 it can determine and broadcast its own position. Aircraft 18b, on the other hand, is not equipped with an ADS-B system and thus is unable to broadcast its own position.

ADS-B system 24 transmits ADS-B signals 28 which are received by a bi-static receiving system 29 which includes a bi-static receiver 30 and a bi-static receiver antenna 32. Antenna 32 is provided having an antenna characteristic (e.g. antenna pattern and gain characteristic which allows antenna 32 to intercept a portion of both ADS-B signal 28 (from ADS-B equipped aircraft 18a) and transponder reply signal 22b (from non-ADSB equipped aircraft 18b). Alternatively antenna 32 may be provided from multiple antennas (e.g. first and second antennas) and multiple receivers (e.g. first and second receivers with both receivers connected to same processor). Regardless of the particular manner in which the antenna 32 and receiver 30 are implemented, bi-static receiving system 29 receives both ADS-B signals and non-ADS-B transponder signals (e.g. transponder Mode A/C/S signals).

In one embodiment, antenna 32 is provided as a single antenna having a substantially omni-directional antenna pattern. Antenna 32 may also be provided from other configurations having other antenna patterns. For example, antenna 32 may be provided from one or more fixed sector antennas (e.g. one or more antennas having fixed directional patterns each of which covers a specific direction).

As mentioned above, ADS-B systems can use transponder Mode A/C/S protocols and most ADS-B receivers are capable of receiving all Mode A/C/S responses including responses to interrogations from interrogators (e.g. interrogator 10). Normally, such responses are discarded by ADS-B systems as they do not contain the position of the aircraft. In accordance with the systems and techniques described herein, however, bi-static receiving system 29 which receives and operates on both transponder signals (e.g. Mode A/C/S signals) and ADS-B signals determines a position of non-ADS-B equipped aircraft (e.g. aircraft 18b) using ADS-B information from ADS-B equipped aircraft (e.g. aircraft 18a) and bi-static radar processing techniques.

Briefly, this is accomplished in two phases. In the first phase, since the interrogator antenna azimuth is unknown, the bi-static receiver 30 utilizes ADS-B signals (e.g. ADS-B position reports) to determine an azimuth position of a local interrogator antenna (e.g. antenna 12) as a function of time. Stated differently, the ADS-B signals are used to determine the direction in which an interrogator antenna is pointing at specific points in time. Then, by knowing the speed at which the interrogator antenna rotates, it is then possible to determine the position of the interrogator antenna at any point in time (i.e. it is possible to determine direction in which the interrogator antenna is pointing at any point in time). This is equivalent to saying that the azimuth direction of the antenna is known.

In a second phase, the azimuth position of the interrogator antenna is used to compute a position (i.e. a latitude and longitude) of an aircraft which is not equipped with an ADS-B system (e.g. non-ADSB equipped aircraft 18b). This is accomplished using a bi-static processing technique as will be described in detail below in conjunction with FIGS. 2-4A.

Figure 2:
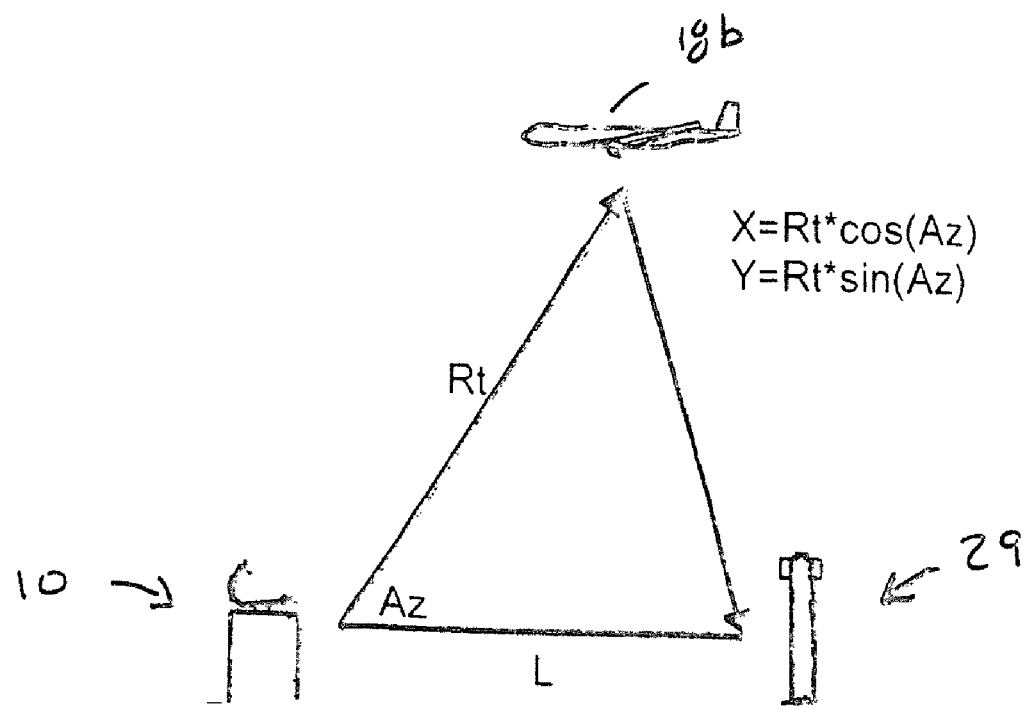
FIG. 2 is a schematic diagram illustrating the positional relationship between an aircraft not equipped with an ADS-B transponder, a secondary radar and a bi-static receiver.

Referring now to FIG. 2, in which like elements of FIG. 1 are provided having like reference designations, given the time an ADS-B signal response is received at bi-static receiving system 29 and given the position of the bi-static receiving system, if the position of the interrogator 10 which originated the interrogation signal and antenna azimuth is known and the distance between interrogator 10 and bi-static receiving system 29 is known, the position of non-ADS-B aircraft 18b can be calculated using Equation (1):

$$Rt=(R^2-L^2)/2*(R-L*\sin(Az))$$  Equation (1)

where:
L is the distance between the ADS-B receiver and radar; and
R is the round trip distance from the interrogator 10 to aircraft 18b and back to the bi-static receiving system 29.
R may be computed as shown in Equation (2):

$$R=C*(Tt-Tr)$$  Equation (2)

where:
Tt is the time of transmit at the interrogator 10; and
Tr is the time of receipt at the bi-static receiving system 29.

These calculations are predicated on an accurate estimate for the radar antenna azimuth (and the corresponding time of transmit).

The radar azimuth as a function of time can be determined using Mode A/C/S replies from aircraft for which an ADS-B reported position has been received at the same time. Thus, given an ADS-B report, the azimuth of an interrogator antenna may be computed as shown in Equation (3):

$$Azimuth=\arcsin(Dx/Rt)$$  Equation (3)

where:
Dx is the difference in latitude between the target and the radar (i.e. the difference in latitude between the ADS-B aircraft and the interrogating radar. az=sin (opp/hyp) where opp=Rt and hyp=delta longitude; it should be appreciated that at very large distance, there may be some error introduced and to reduce this error the measurement is made in the radar plane which is defined as the plane tangent to the earth at the radar oriented with increasing y values to the north);

The transmit time (Tt) for the computed azimuth is computed as shown in Equation (4):

$$Tt=Tr-C*(Rr+Rt)$$  Equation (4)

where Tr=the time the response is received at the bistatic receiver, Rr=target range to the bistatic receiver, and Rt=range to the secondary interrogator transmitter.

Equation (3) and (4) thus illustrates one technique to compute the azimuth of an interrogator antenna at a specific point in time. Since the radar rotates at a constant rate, the azimuth may be derived for any given point in time in the above-referenced first phase.

This approach may be implemented in hardware or by programming a processor that processes ADS-B inputs either as part of a ground-based system (e.g. an ATC) or as part of airborne avionics (e.g. CDTI or TCAS). The processing may be provided in partnership with an ADS-B radio provider or as stand-alone processing component to augment existing ground automation.

Figure 3:
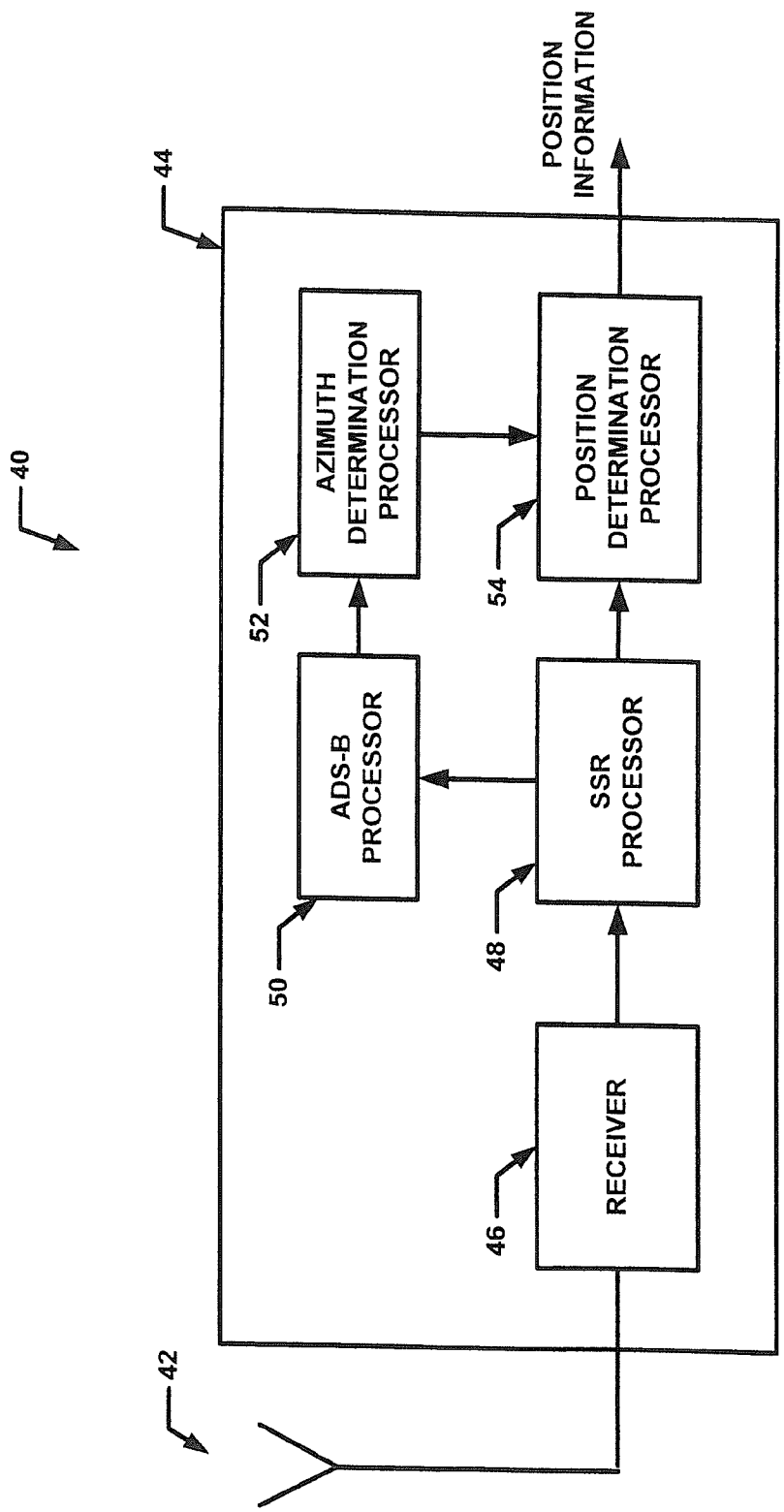
FIG. 3 is a block diagram of a bi-static receiver.

Referring now to FIG. 3, a bi-static receiving system 40 which may be the same as or similar to bi-static receiving system 29 described above in conjunction with FIGS. 1 and 2 includes an antenna 42 disposed to provide signals to a bi-static receiver 44. Antenna 42 and bi-static receiver 44 may be the same as or similar to antenna 32 and bi-static receiver 30 described above in conjunction with FIGS. 1 and 2.

Bi-static receiver 44 includes a receiver 46 which down converts and otherwise processes signals fed thereto from antenna 42 and provides appropriately converted and processed signals to an interrogator processor 48. interrogator processor 48 provides ADS-B signals to an ADS-B processor 50. ADS-B processor 50 processes ADS-B signals and provides the signals to an azimuth determination processor 52 which utilizes the ADS-B signals to determine an azimuth position of an interrogator antenna (e.g. such as interrogator antenna 12 in FIG. 1).

Once azimuth determination processor 52 determines the interrogator antenna azimuth information, interrogator processor processes transponder signals (e.g. Mode A/C/S transponder reply signals) from non-ADSB equipped aircraft (e.g. non-ADSB equipped aircraft 18b in FIG. 1) and position determination processor 54 determines the position of the non-ADSB equipped aircraft and provides the information at an output thereof. The position information may then be provided to an ATC display or may be otherwise used in an ATC system.

Figure 4:
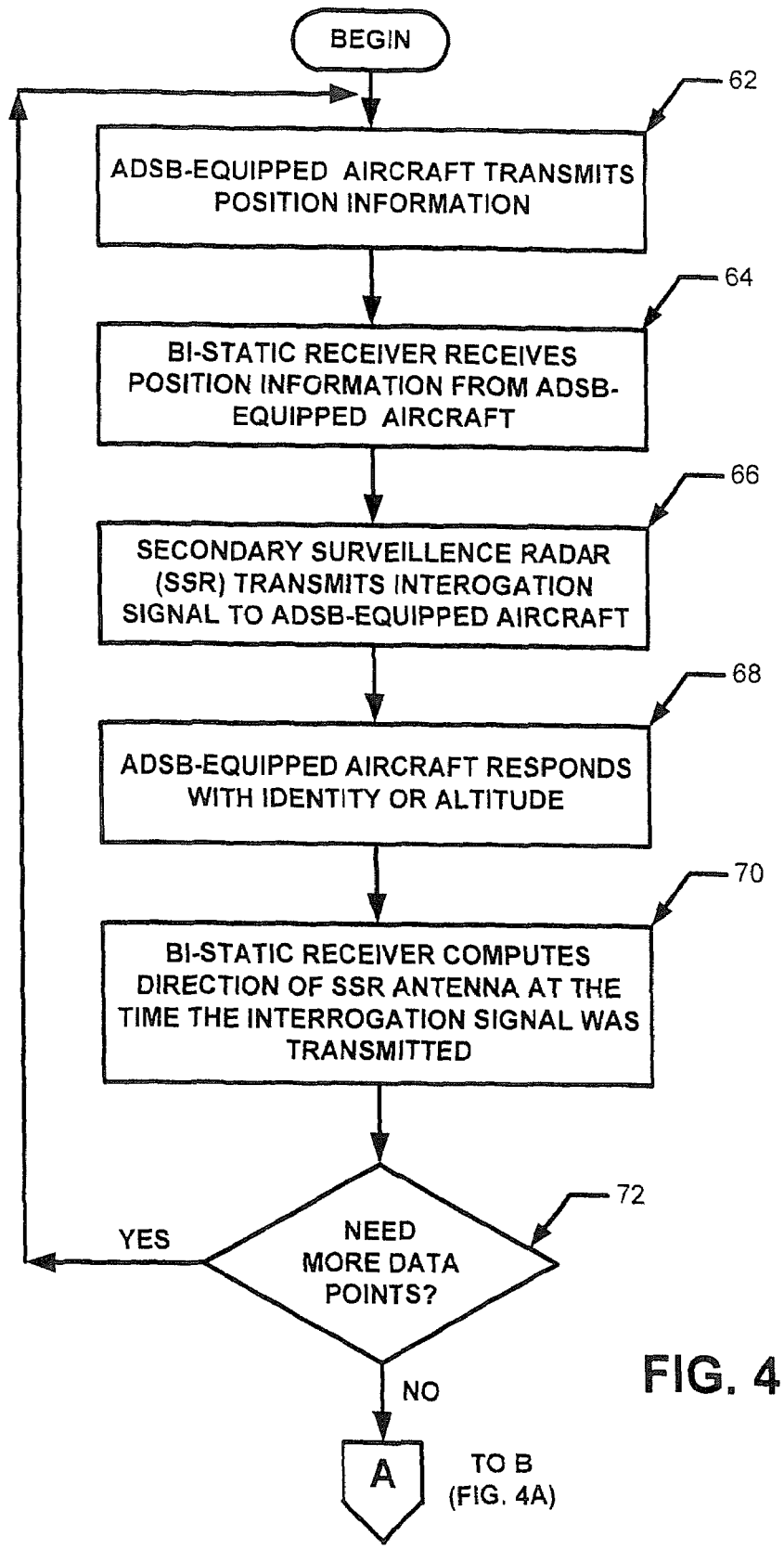
FIGS. 4 and 4A are a pair of flow diagrams which illustrate a process for determining a position of an aircraft equipped with a ATCRBS transponder but which is not equipped with an ADS-B system.
Figure 4A:
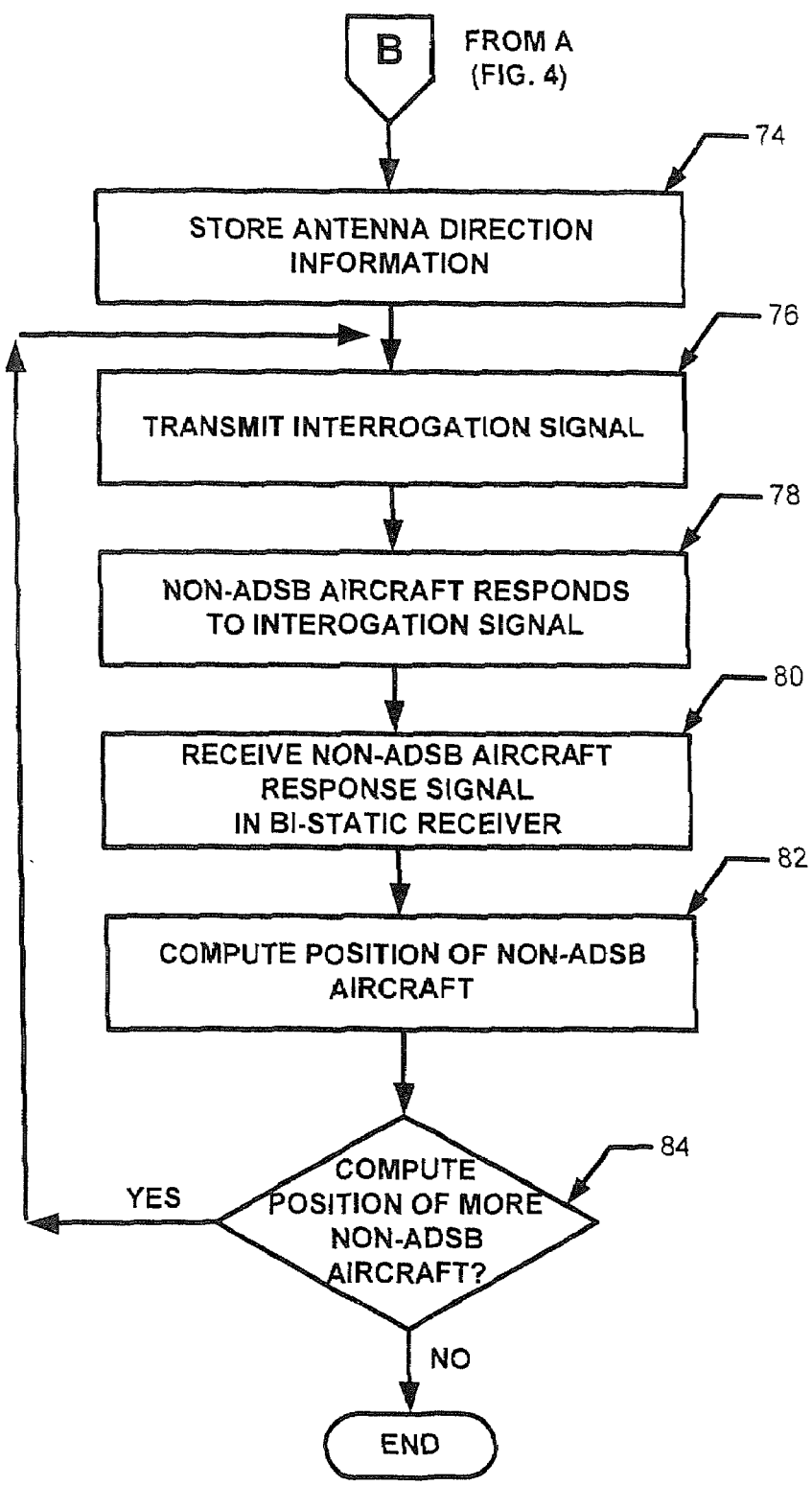

FIGS. 4 and 4A are a series of flow diagrams which show the processing performed by a processing apparatus which may, for example, be provided as part of bi-static receiver 30 or as a separate processor to enable position computations for non-ADSB equipped aircraft. The rectangular elements (typified by element 62 in FIG. 4), are herein denoted "processing blocks" and represent computer software instructions or groups of instructions. The diamond shaped elements (typified by element 72 in FIG. 4), are herein denoted "decision blocks" and represent computer software instructions, or groups of instructions which affect the execution of the computer software instructions represented by the processing blocks.

Alternatively, the processing and decision blocks represent steps performed by functionally equivalent circuits such as a digital signal processor (DSP) circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that, unless otherwise indicated herein, the particular sequence of steps described is illustrative only and can be varied without departing from the spirit of the concepts, systems and techniques described herein.

Turning now to FIG. 4, processing begins as shown in processing blocks 62, 64 by an ADS-B equipped aircraft transmitting position information (e.g. a position report) which is received by a bi-static receiver. As shown in processing blocks 66 and 68, an interrogator transmits an interrogation signal to the ADS-B equipped aircraft and the ADS-B equipped aircraft responds with its identity and/or altitude. This information is transmitted in broadcast mode so that the response can also be received by the interrogator and a bi-static receiver (such as interrogator 10 and bi-static receiver 30 shown in FIG. 1).

As shown in processing block 70, the bi-static receiver uses the information provided thereto from the ADS-B equipped aircraft to compute the direction (e.g. the azimuth position) of the interrogator antenna from which the interrogation signal originated at the time the interrogation signal was transmitted. That is, the azimuth position of the interrogator at the time the interrogation signal was sent is computed. In practical systems, the processing block 64 flows into processing block 70 in parallel with (e.g. concurrently with) processing blocks 66 and 68.

Next, as shown in decision block 72, a decision is made as to whether more data points are needed to compute the interrogator antenna direction. If more data points are needed, then processing again flows to processing blocks 62-70. It should be appreciated that when more additional data points are collected, each additional data point may be provided by the same ADS-B equipped aircraft or from a different ADS-B equipped aircraft (or from a combination of the same and different ADS-B equipped aircraft). It should also be appreciated that, in general, the process is completed more rapidly when data is taken from two or more different ADS-B equipped aircraft than from a single (i.e. the same) ADS-B equipped aircraft. This is due, at least in part, to the time delay which exists in the time between transmitted transponder signals from a single aircraft cause by the rotation (or scan pattern) of the radar antenna.

If in processing block 72 a decision is made that no more data points are needed to compute the interrogator antenna direction, then processing flows to processing block 74 in which the antenna direction is computed and stored (at least temporarily) for later use. Processing then proceeds to processing blocks 76 and 78 in which an interrogator transmits an interrogation signal and a non-ADSB equipped aircraft responds to the interrogation signal. It should be appreciated that any Mode A/C aircraft with a line-of-sight to the interrogator which transmits the interrogation signal will send a reply. Mode S aircraft will respond to an "all call" and when selected by the interrogator. Thus, multiple non-ADSB equipped aircraft may reply to the interrogation signal.

As shown in processing blocks 80 and 82, the non-ADSB equipped aircraft response signal is received in the bi-static receiver and a position of the non-ADSB equipped aircraft is computed. Processing then proceeds to decision block 84 in which a decision is made as to whether there are more non-ADSB equipped aircraft for which positions may be computed. In practical ATC systems, the interrogator continuously emits transponder signals and thus processing blocks 76-82 continuously repeat.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

The invention claimed is:

1. A process for determining a position of a non-Automatic Dependent Surveillance Broadcast (non-ADSB) equipped aircraft comprises:
   receiving, in a bi-static receiving system, a first group of signals from a first ADSB equipped aircraft;
   receiving, in the bi-static receiving system, a second group of signals from a first non-ADSB equipped aircraft; and
   processing the first and second group of signals in the bi-static receiving system using a bi-static radar processing technique by determining an azimuth position of an interrogator antenna using the first group of signals and determining a position of the non-ADSB equipped aircraft using the second group of signals.

2. The process of claim 1 wherein the first group of signals correspond to ADS-B signals.

3. The process of claim 1 wherein the second group of signals correspond to one of Mode A/C/S responses from aircraft having an ADS-B receiver disposed therein.

4. The process of claim 1 wherein the first group of signals correspond to ADSB signals transmitted from an ADSB equipped aircraft and the second group of signals correspond to Mode A/C/S signals transmitted from a non-ADSB equipped aircraft.

5. A system to derive a position of a non-ADSB equipped aircraft, the system comprising:
 (a) an interrogator comprising:
  an interrogator antenna; and
  an interrogator receiver; and
 (b) a bi-static receiving system comprising:
  an antenna configured to receive Mode A/C/S signals and Mode ADS-B signals;
  an interrogator processor configured to process Mode A/C/S signals;
  an ADS-B processor configured to process ADS-B signals;
  an azimuth determination processor coupled to receive signals from said ADS-B processor and to determine an azimuth position of the interrogator antenna; and
  a position determination processor coupled to receive signals from said azimuth determination processor and said interrogator processor and to derive a position of the non-ADSB equipped aircraft.

6. The system of claim 5 wherein said bi-static receiving system is stationary.

7. The system of claim 5 wherein said bi-static receiving system is mounted on a movable vehicle.

8. The system of claim 5 wherein said interrogator is stationary.

9. The system of claim 5 wherein said interrogator is mounted on a movable vehicle.

10. The system of claim 5 wherein said interrogator corresponds to a secondary surveillance radar (SSR).

11. The system of claim 10 wherein said interrogator antenna is one of a rotating antenna or an electronically scanned antenna.

12. The system of claim 5 wherein said bi-static receiving system comprises an ADS-B receiver and a processor configured to perform bi-static radar processing.

13. A method to derive a position of a non-ADSB equipped aircraft comprising:
 determining, in a bi-static receiving system, an azimuth position of an interrogator antenna as a function of time using one or more ADSB signals from an ADSB equipped aircraft; and
 deriving a position of the non-ADSB equipped aircraft using the azimuth position of the interrogator antenna and one or more transponder signals from the non-ADSB equipped aircraft.

14. The method of claim 13 wherein determining an azimuth position of an interrogator antenna as a function of time comprises receiving one or more ADS-B reports in a bi-static receiving system and deriving an azimuth position of the interrogator radar based upon one or more of the one or more ADS-B reports.

15. The method of claim 13 wherein using the azimuth position of the interrogator antenna to derive a position of the non-ADSB equipped aircraft comprises:
 transmitting one or more Mode A/C/S transponder signals from an interrogator having an interrogator antenna;
 receiving, in the bi-static receiving system, one or more Mode A/C/S transponder reply signals provided by the non-ADSB equipped aircraft;
 computing a longitude and latitude of the non-ADSB equipped aircraft using the azimuth position of the interrogator antenna, a range to the non-ADSB equipped aircraft and a known distance between the interrogator and the bi-static receiving system.

* * * * *